(12) United States Patent
Lin

(10) Patent No.: US 7,211,967 B2
(45) Date of Patent: May 1, 2007

(54) STRIP LIGHT WITH CONSTANT CURRENT

(76) Inventor: Yuan Lin, 5 Viewmont Court, Doncaster East, 3109 Vic. (AU)

(*) Notice: Subject to any disclaimer, the term of this patent is extended or adjusted under 35 U.S.C. 154(b) by 0 days.

(21) Appl. No.: 11/281,613

(22) Filed: Nov. 18, 2005

(65) Prior Publication Data
US 2006/0076901 A1    Apr. 13, 2006

Related U.S. Application Data

(63) Continuation-in-part of application No. 10/717,493, filed on Nov. 21, 2003, now abandoned.

(51) Int. Cl.
*G05F 1/00*    (2006.01)
(52) U.S. Cl. .................. 315/291; 315/294; 315/312; 327/109; 327/223; 250/205
(58) Field of Classification Search .......... 315/185 R, 315/185 S, 200 A, 169.3, 291, 294, 312, 315/224, 316; 362/27, 612, 543, 545, 227, 362/234, 800, 806; 345/84; 340/815.45; 327/109, 175, 223; 323/288; 250/205
See application file for complete search history.

(56) References Cited

U.S. PATENT DOCUMENTS

| | | | | |
|---|---|---|---|---|
| 3,033,970 | A * | 5/1962 | Eisler | 219/549 |
| 4,298,869 | A * | 11/1981 | Okuno | 345/82 |
| 4,673,864 | A * | 6/1987 | Dessens et al. | 323/221 |
| 4,717,868 | A * | 1/1988 | Peterson | 323/288 |
| 5,152,599 | A * | 10/1992 | Lewis et al. | 362/485 |
| 6,166,496 | A * | 12/2000 | Lys et al. | 315/316 |
| 6,218,785 | B1 * | 4/2001 | Incerti | 315/185 S |
| 6,346,777 | B1 * | 2/2002 | Kim | 315/185 S |
| 6,791,283 | B2 * | 9/2004 | Bowman et al. | 315/291 |

* cited by examiner

*Primary Examiner*—Haissa Philogene
(74) *Attorney, Agent, or Firm*—Troxell Law Office, PLLC

(57) ABSTRACT

A strip light is disclosed. The light comprises an illuminating unit including a plurality of illuminators (e.g., LEDs) directly and electrically coupled in series, and a constant current stabilization unit with temperature compensating capability for supplying a constant current to each illuminator. A number of embodiments of the constant current stabilization unit are made possible. The invention further has advantages of energy saving, even brightness of the illuminators, less heat generation, and durability.

20 Claims, 12 Drawing Sheets

STRIP LIGHT WITH CONSTANT CURRENT

This application is a continuation-in-part application of the U.S. Ser. No. 10/717,493 filed Nov. 21, 2003 now abandoned.

BACKGROUND OF THE INVENTION

1. Field of the Invention

The present invention relates to strip lights and more particularly to such a strip light having an arrangement for supplying a constant current to each illuminator thereof.

2. Description of Related Art

A conventional LED (light-emitting diode) based strip light is disclosed in Taiwanese Patent Published No. 516,709 (the prior art). The prior art comprises a plurality of LEDs (light emitting diodes) mounted on a circuit board, a plurality of resistors coupled to each of the LEDs on the circuit board, two diodes at both ends of the circuit board, a positive terminal at one end of the circuit board for coupling to another LED based strip light or power source, a negative terminal at the other end of the circuit board for coupling a positive terminal of another LED based strip light or power source, upper insulation means for enclosing the LEDs, the resistors, the diodes, and the positive and the negative terminals on a top surface of the circuit board, and lower insulation means for enclosing pins, contacts, and circuits on a bottom surface of the circuit board.

The prior art is adapted to regulate current. However, the prior art suffered from several disadvantages. For example, high heat can be generated by a LED and its coupled resistor. Such heat may be excessively high if the number of LEDs and thus the number of resistors are large (i.e., many LEDs and resistors are coupled in series). Also, brightness of the LEDs can be lowered due to increased resistance. In other words, a considerable portion of electrical energy is consumed (i.e., wasted) by resistors rather than by LEDs. Further, brightness of one LED may be different from that of other LEDs due to uneven resistor in respective LEDs.

U.S. Pat. No. 4,717,868 entitled "Uniform Intensity led Driver Circuit" discloses the following characteristics. Voltage from a string of LEDs is fed to an output terminal 19. The voltage is decreased by a resistor R2 prior to turning on transistors Q3, Q4, and Q7. Further, high and low voltage levels are controlled by a node 13 for turning on transistor Q1 and for inputting signal through a NOR gate 17 and an inverter 16. Another signal through the NOR gate 17 is fed to a node 14 which is adapted to control high and low voltage levels for turning on transistor Q6. A comparison signal is generated by a comparator 15 in response to feeding two voltage signals from nodes 27 and 28 and comparing same. Further, the comparison signal is fed to the NOR gate 17 and high or low voltage level is fed to the NOR gate 17 via node 13 respectively for turning on transistor Q5 or not. As a result, the LEDs can maintain its constant current state. However, nodes 13 and 14 for high or low voltage level control, and NOR gate 17 for operation and output are required by the patent and thus the patent does not respond to temperature change. Also, no overload protection is provided. Further, PWM (pulse width modulation) for constant current control is not applicable to the patent. This is not desirable. Thus, the need for improvement still exists.

SUMMARY OF THE INVENTION

It is an object of the present invention to provide a strip light having an arrangement for supplying a constant current with temperature compensating capability to each illuminator (e.g., LED) thereof.

It is another object of the present invention to provide a strip light having a temperature insensitive constant current stabilization arrangement so as to obtain advantages of energy saving, even brightness of LEDs, less heat generation, and durability.

To achieve the above and other objects, the present invention provides a strip light device, comprising a constant current stabilization unit having a first, a second, a third and a ground terminals; a first current regulator as an output being electrically connected to the third terminal and the ground terminal of the constant current stabilization unit; a second current regulator being electrically connected to the first terminal of the constant current stabilization unit and a positive terminal of a power source; and an illuminating unit including a plurality of illuminators directly and electrically coupled in series which is electrically connected to the second terminal of the constant current stabilization unit and the positive terminal of the power source; the constant current stabilization unit further comprising: a first transistor as a switch means and having a first resistor electrically coupled in parallel to the second current regulator and the illuminating unit and being turned on in response to current feeding from the first resistor; a second transistor as a controller electrically coupled in parallel to the first transistor and the first current regulator, the second transistor being adapted to control a turning on of the first transistor in response to feeding current from the first current regulator for maintaining a constant current; a third transistor for compensating temperature and including a second resistor and a first capacitor and being electrically coupled in parallel to the first transistor; and a voltage stabilizer including a fourth transistor, a fifth transistor, a sixth transistor, a seventh transistor, a plurality of third resistors, and a second capacitor wherein a turning on or not of the first transistor is responsible for comparing an input voltage with a predetermined voltage and amplifying an output voltage, and the second capacitor n the constant current stabilization unit is operative to supply a constant current to each of the illuminators, the second capacitor is discharged for turning on the third transistor in response to rising temperature, and the first capacitor is discharged to decrease current flowing through the illuminating unit.

The above and other objects, features and advantages of the present invention will become apparent from the following detailed description taken with the accompanying drawings.

DETAILED DESCRIPTION OF THE PREFERRED EMBODIMENTS

Figure 1:
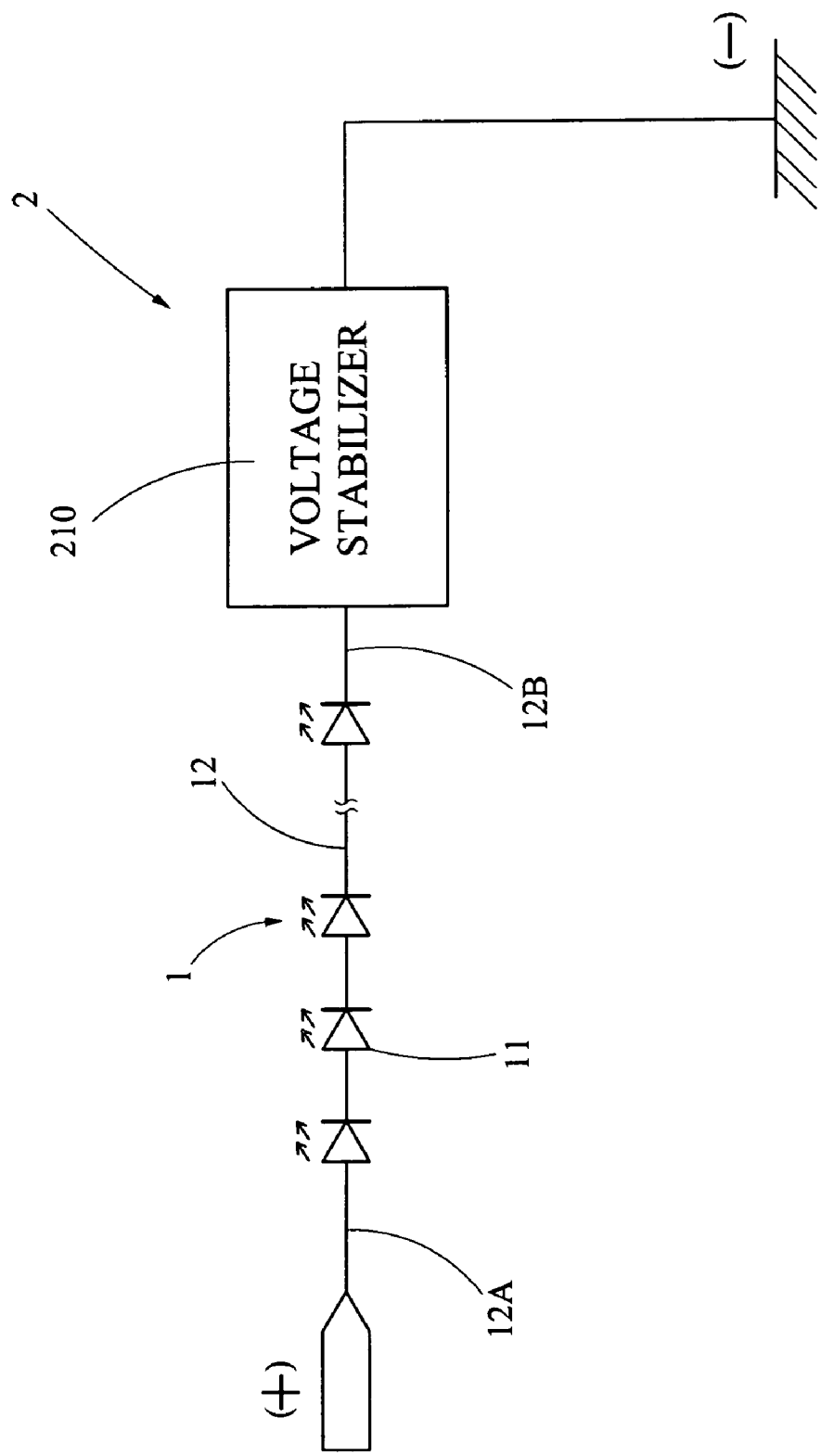
FIG. 1 is a circuit diagram of a first preferred embodiment of strip light according to the invention.

Referring to FIG. 1, there is shown a first preferred embodiment of strip light constructed in accordance with the invention. The strip light is electrically coupled to a power source by a wire 12A. The strip light comprises an illuminating unit 1 including a plurality of illuminators 11 directly and electrically coupled in series by a wire 12, and a wire 12B; and a constant current stabilization unit 2 including a voltage stabilizer 210 electrically coupled to the wire 12B and a current regulator 220 interconnected the voltage stabilizer 210 and ground. By configuring as above, a constant current can be supplied to each LED 11. The illuminator 11 is implemented as a LED (as shown in this and following embodiments) or bulb. The voltage stabilizer 210 is implemented as a conventional circuit, a semiconductor device, or an IC (integrated circuit).

Figure 2:
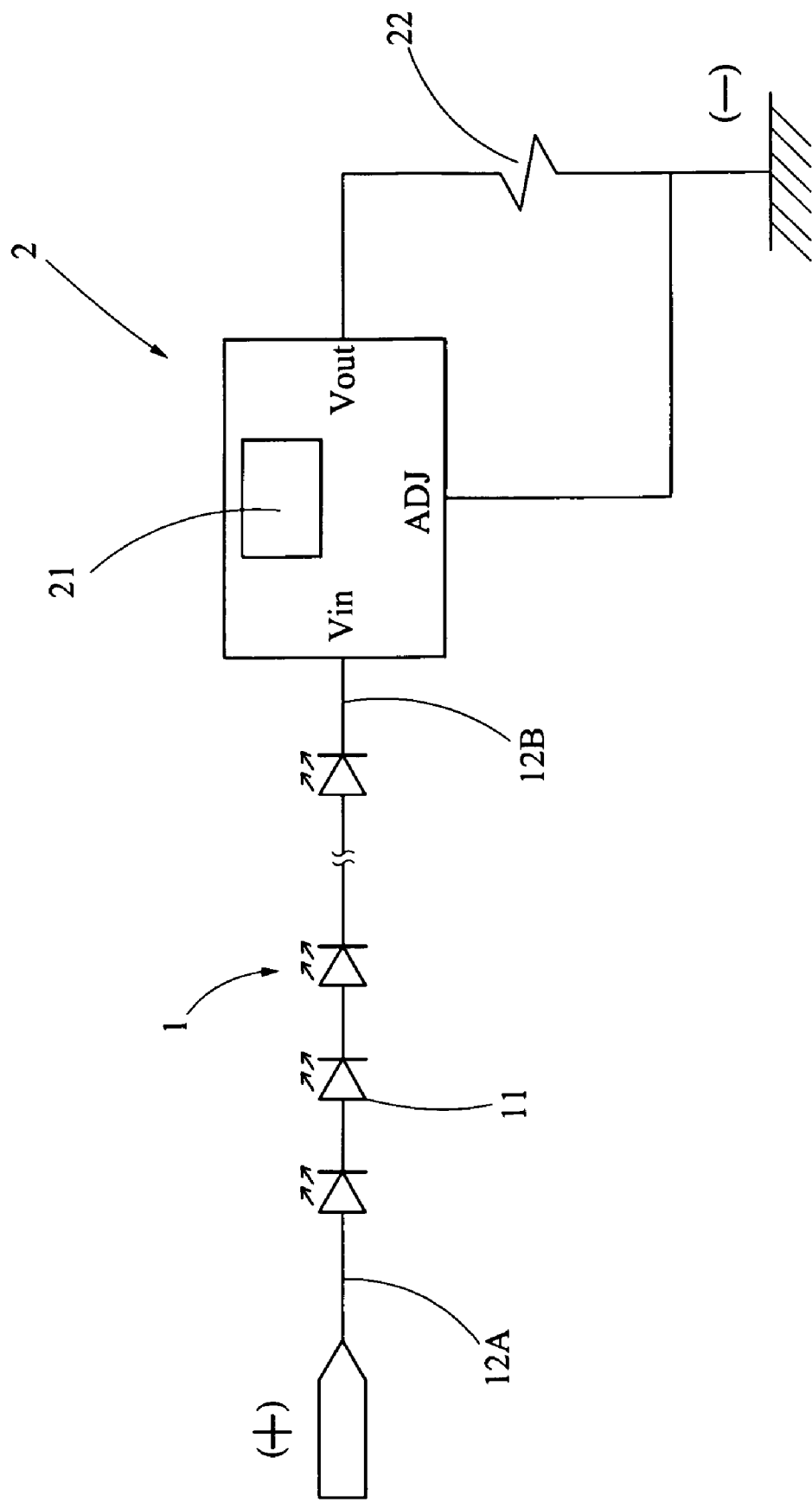
FIG. 2 is a circuit diagram of a second preferred embodiment of strip light according to the invention.
Figure 2A:
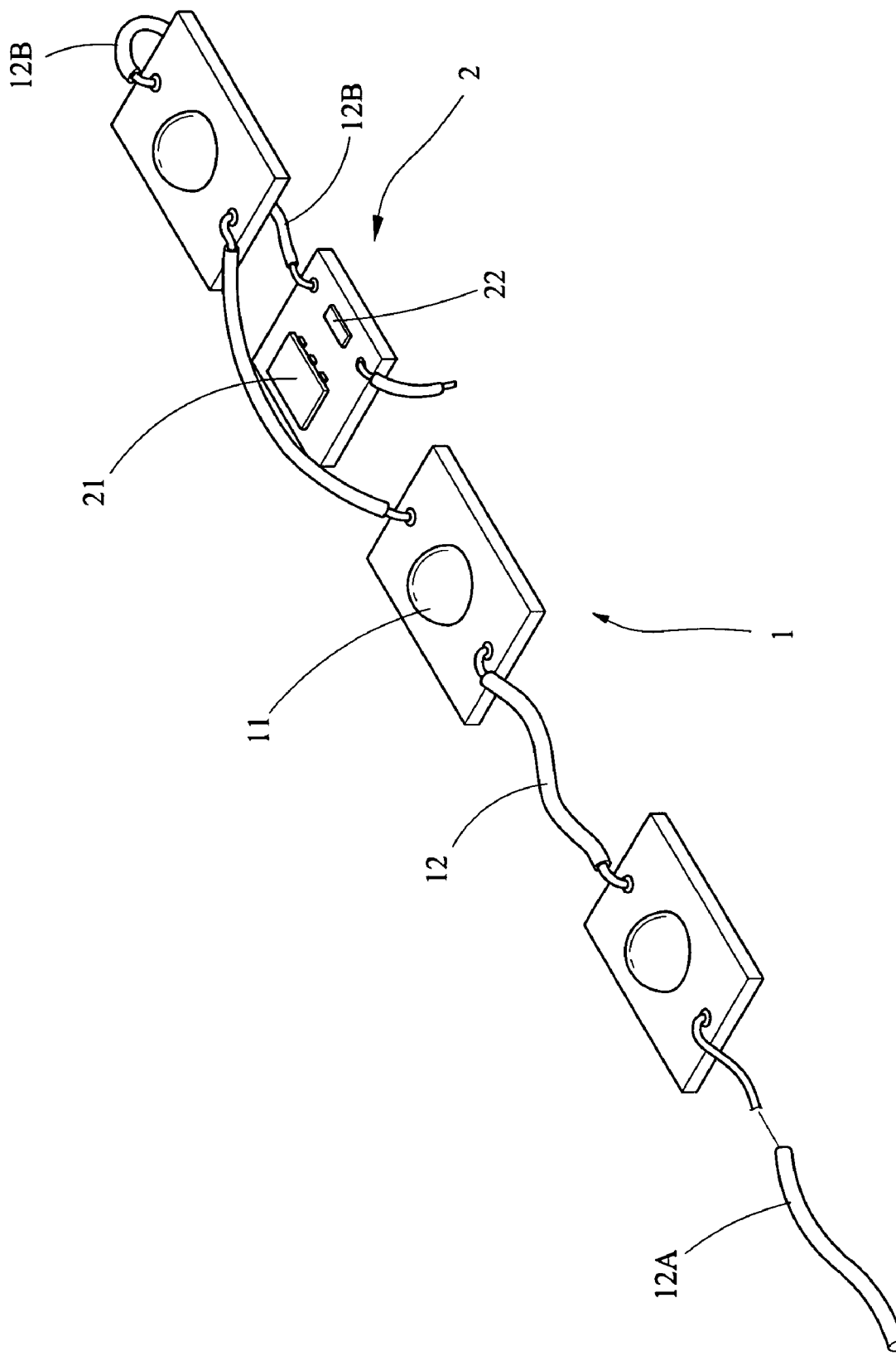
FIG. 2A is a perspective view of the strip light shown in FIG. 2.

Referring to FIGS. 2 and 2A, a second preferred embodiment of the invention is shown. The second preferred embodiment is characterized in the constant current stabilization unit 2 as detailed below. The constant current stabilization unit 2 comprises a voltage stabilizer 21 and a current regulator 22 having one end coupled to the voltage stabilizer 21 and the other end coupled to ground. The current regulator 22 is implemented as a resistor. The power source is adapted to supply a voltage in the range of 2.1 V to 36 V. Thus, the voltage stabilizer 21 is implemented as an LM317 IC based voltage stabilizer in the embodiment. The wire 12B is electrically coupled to an input terminal (Vin) of the voltage stabilizer 21. An output terminal (Vout) of the voltage stabilizer 21 is electrically coupled to the current regulator 22 and an adjustment terminal (ADJ) thereof is coupled to ground. By configuring as above, a constant current can be supplied to each LED 11. Note that the current regulator 22 can be incorporated as part of the voltage stabilizer 21 or even eliminated if the length of the illuminating unit 1 is fixed or the number of the LEDs 11 is fixed.

Figure 2B:
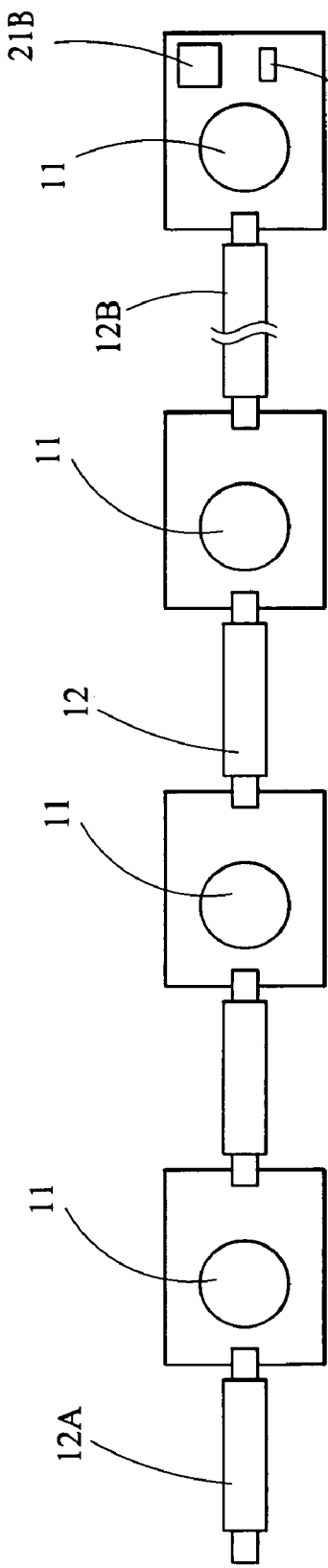
FIG. 2B schematically depicts the electrical connection of a third preferred embodiment of strip light according to the invention.

Referring to FIG. 2B, it schematically depicts the electrical connection of a third preferred embodiment of strip light according to the invention. One of the illuminators 11 (e.g., the right one as shown) is implemented as a COB (chip on board) type LED 11 mounted on a constant current stabilization unit 2B. The constant current stabilization unit is implemented as a COB type constant current stabilization unit 2B. Also, the voltage stabilizer is implemented as a COB type voltage stabilizer 21B and the current regulator is implemented as a COB type current regulator 22B. The COB type LED 11 is electrically coupled to the COB type voltage stabilizer 21B and the COB type current regulator 22B in series. The wires of flat metal foil type 12, 12A, and 12B having a relatively larger flat cross-sectional area, coupled to the LEDs 11, are capable of permitting a relatively large current to pass therethrough. The wire 12B is coupled between the COB type LED 11 and the adjacent LED 11.

Figure 2F:
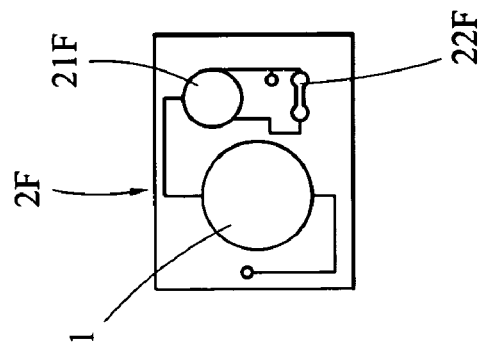
FIGS. 2C, 2D, 2E, and 2F are top plan views of constant current stabilization unit according to fourth, fifth, sixth, and seventh preferred embodiments of the invention respectively.
Figure 2E:
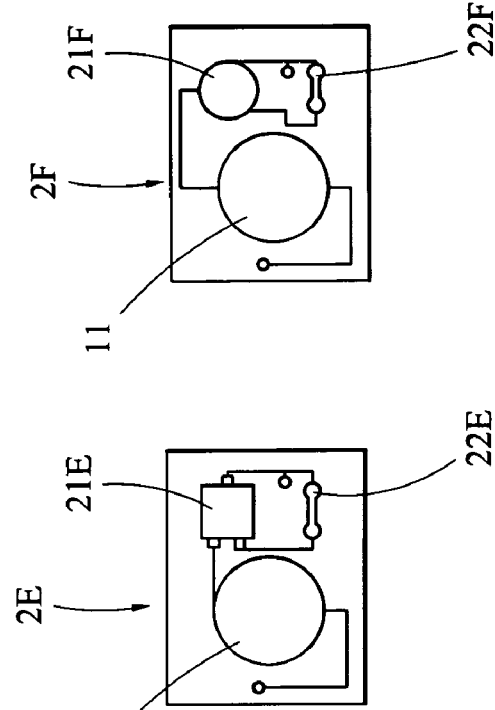
Figure 2D:
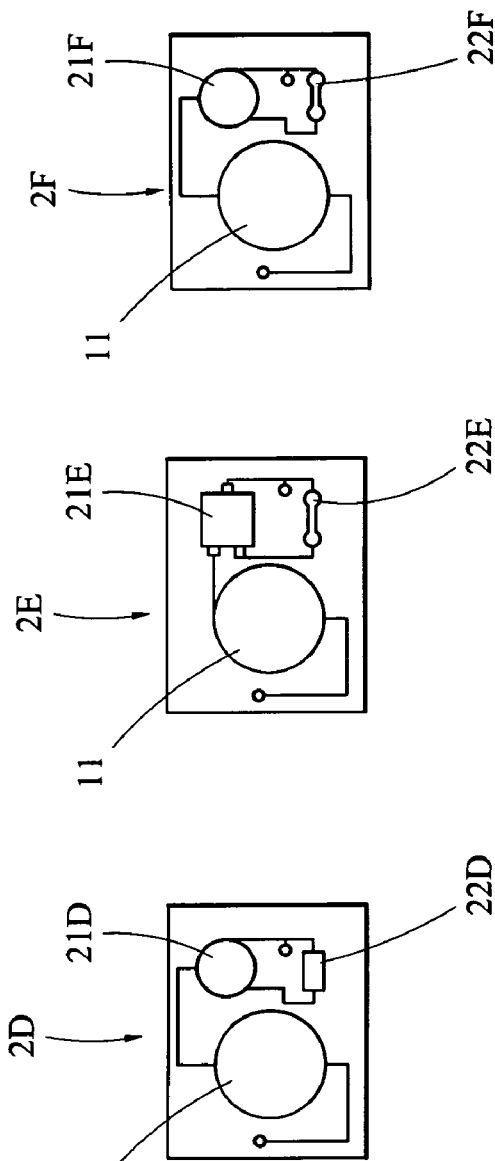
Figure 2C:
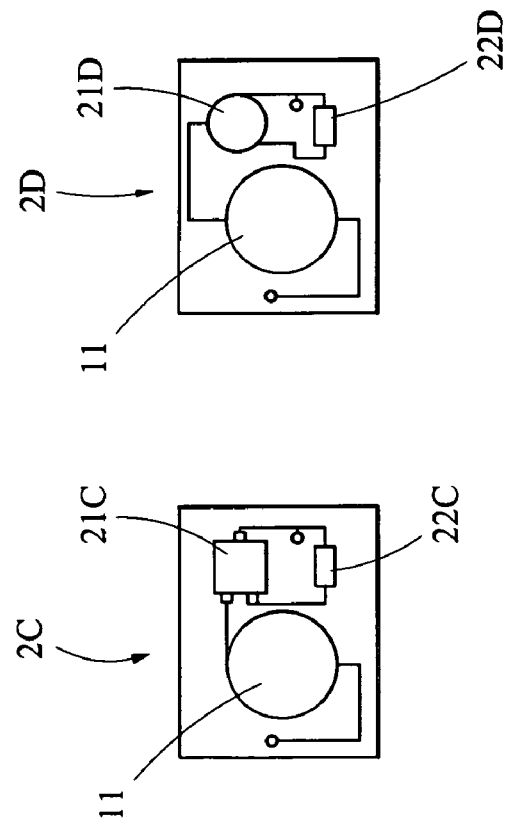

Referring to FIG. 2C, a top plan view of a constant current stabilization unit 2C according to a fourth preferred embodiment of the invention is shown. The constant current stabilization unit 2C has the same characteristics as the constant current stabilization unit 2B except that the former comprises a SMD (surface mounting) type voltage stabilizer 21C and a SMD type current regulator 22C. Also, the COB type LED 11, the SMD type voltage stabilizer 21C, and the SMD type current regulator 22C are formed on the same circuit board and are electrically coupled together.

Referring to FIG. 2D, a top plan view of a constant current stabilization unit 2D according to a fifth preferred embodiment of the invention is shown. The constant current stabilization unit 2D has the same characteristics as the constant current stabilization unit 2B except that the former comprises a bare dice encapsulation type voltage stabilizer 21D and a SMD type current regulator 22D. Also, the COB type LED 11, the voltage stabilizer 21D, and the current regulator 22D are formed on the same circuit board and are electrically coupled together.

Referring to FIG. 2E, a top plan view of a constant current stabilization unit 2E according to a sixth preferred embodiment of the invention is shown. The constant current stabilization unit 2E has the same characteristics as the constant current stabilization unit 2B except that the former comprises a SMD type voltage stabilizer 21E and a printed carbon film type current regulator 22E. Also, the COB type LED 11, the SMD voltage stabilizer 21E, and the printed carbon film type current regulator 22E are formed on the same circuit board and are electrically coupled together.

Referring to FIG. 2F, a top plan view of a constant current stabilization unit 2F according to a seventh preferred embodiment of the invention is shown. The constant current stabilization unit 2F has the same characteristics as the constant current stabilization unit 2B except that the former comprises a bare dice encapsulation type voltage stabilizer 21F and a printed carbon film type current regulator 22F. Also, the COB type LED 11, the bare dice encapsulation type voltage stabilizer 21F, and the printed carbon film type current regulator 22F are formed on the same circuit board and are electrically coupled together.

Figure 2G:
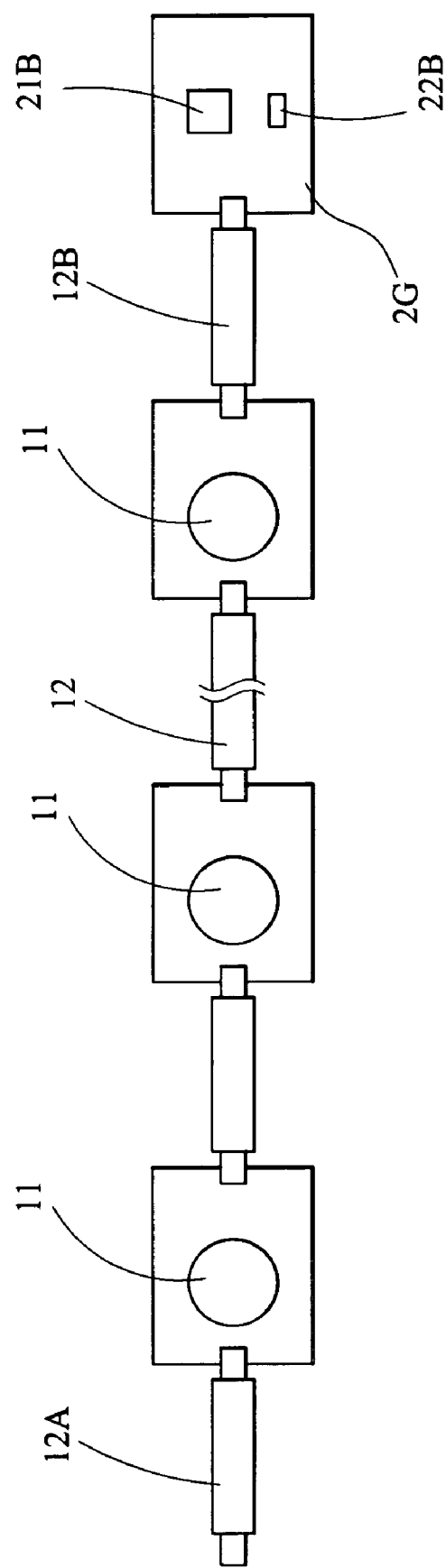
FIG. 2G schematically depicts the electrical connection of an eighth preferred embodiment of strip light according to the invention.

Referring to FIG. 2G, it schematically depicts the electrical connection of an eighth preferred embodiment of strip light according to the invention. This preferred embodiment substantially has same structure as the third preferred embodiment. The differences between these two preferred embodiments, i.e., the characteristics of the eighth preferred embodiment are detailed below. The COB type LED 11 is eliminated from a constant current stabilization unit 2G which comprises a COB type voltage stabilizer 21B and a COB type current regulator 22B.

Figure 3:
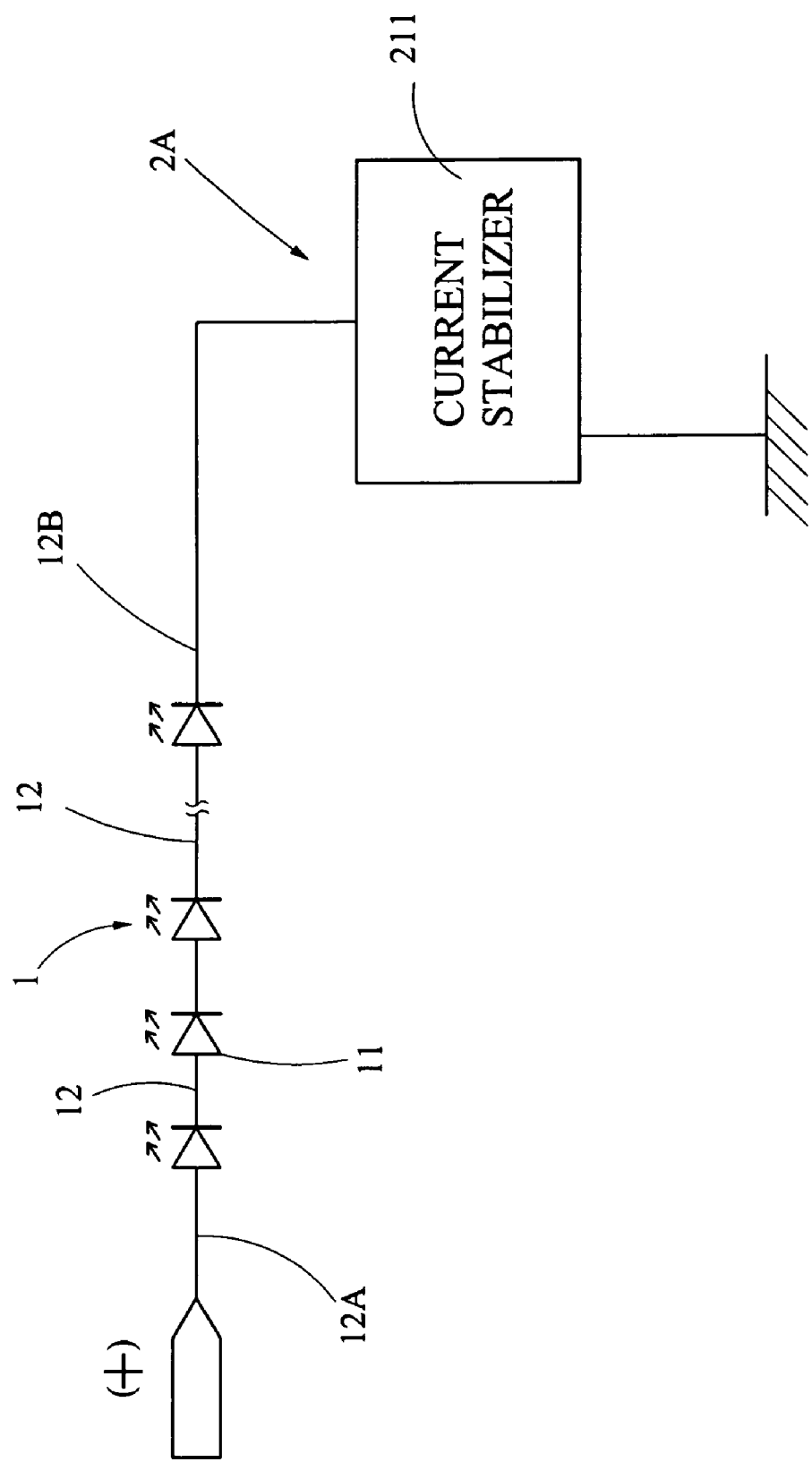
FIG. 3 is a circuit diagram of a ninth preferred embodiment of strip light according to the invention.

Referring to FIG. 3, there is shown a circuit diagram of a ninth preferred embodiment of strip light according to the invention. This preferred embodiment substantially has same structure as the first preferred embodiment except that the current regulator of the constant current stabilization unit 2A is eliminated and the voltage stabilizer 210 is replaced by a current stabilizer 211. Further, the current stabilizer 211 is coupled to ground directly.

Figure 4:
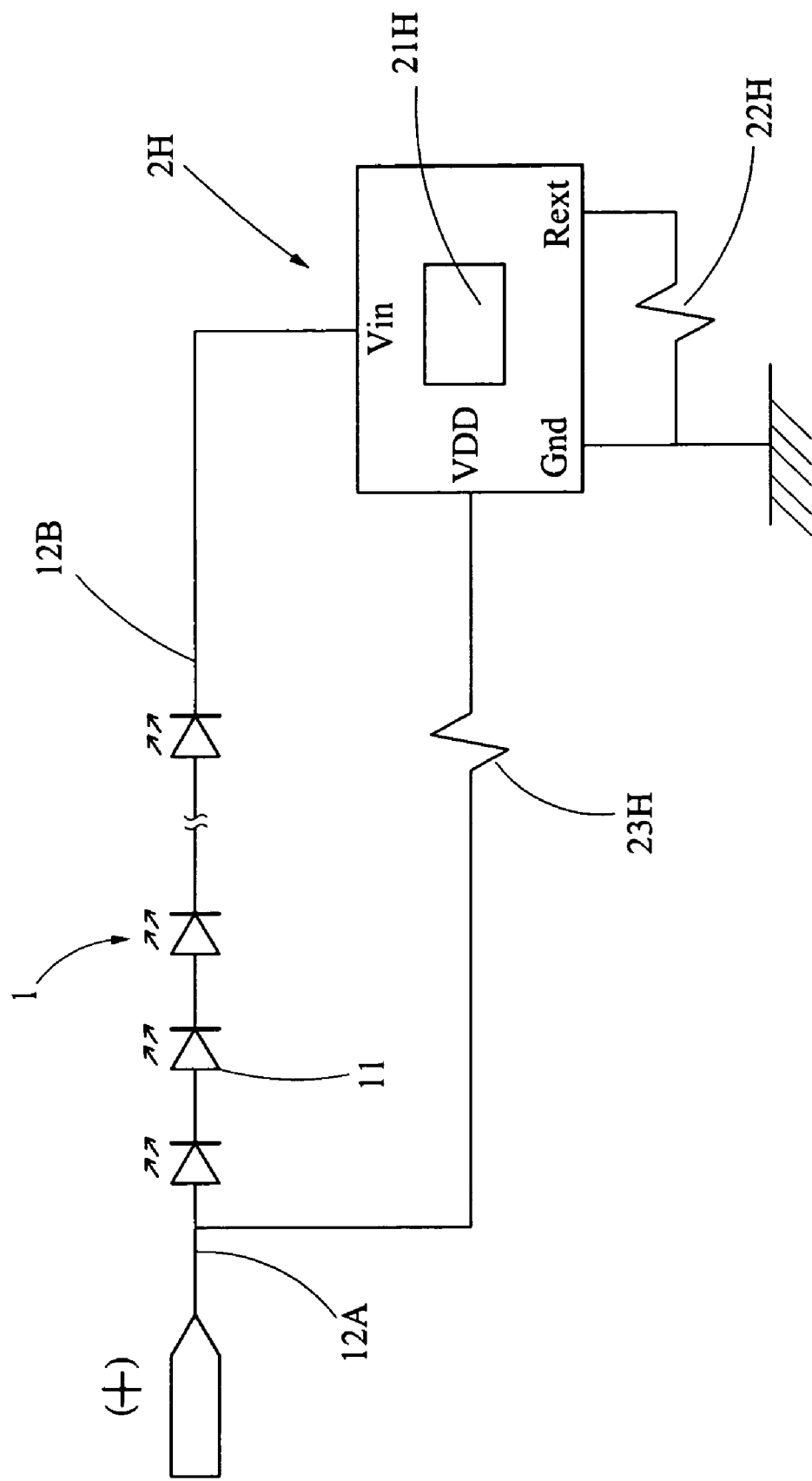
FIG. 4 is a circuit diagram of a tenth preferred embodiment of strip light according to the invention.
Figure 4A:
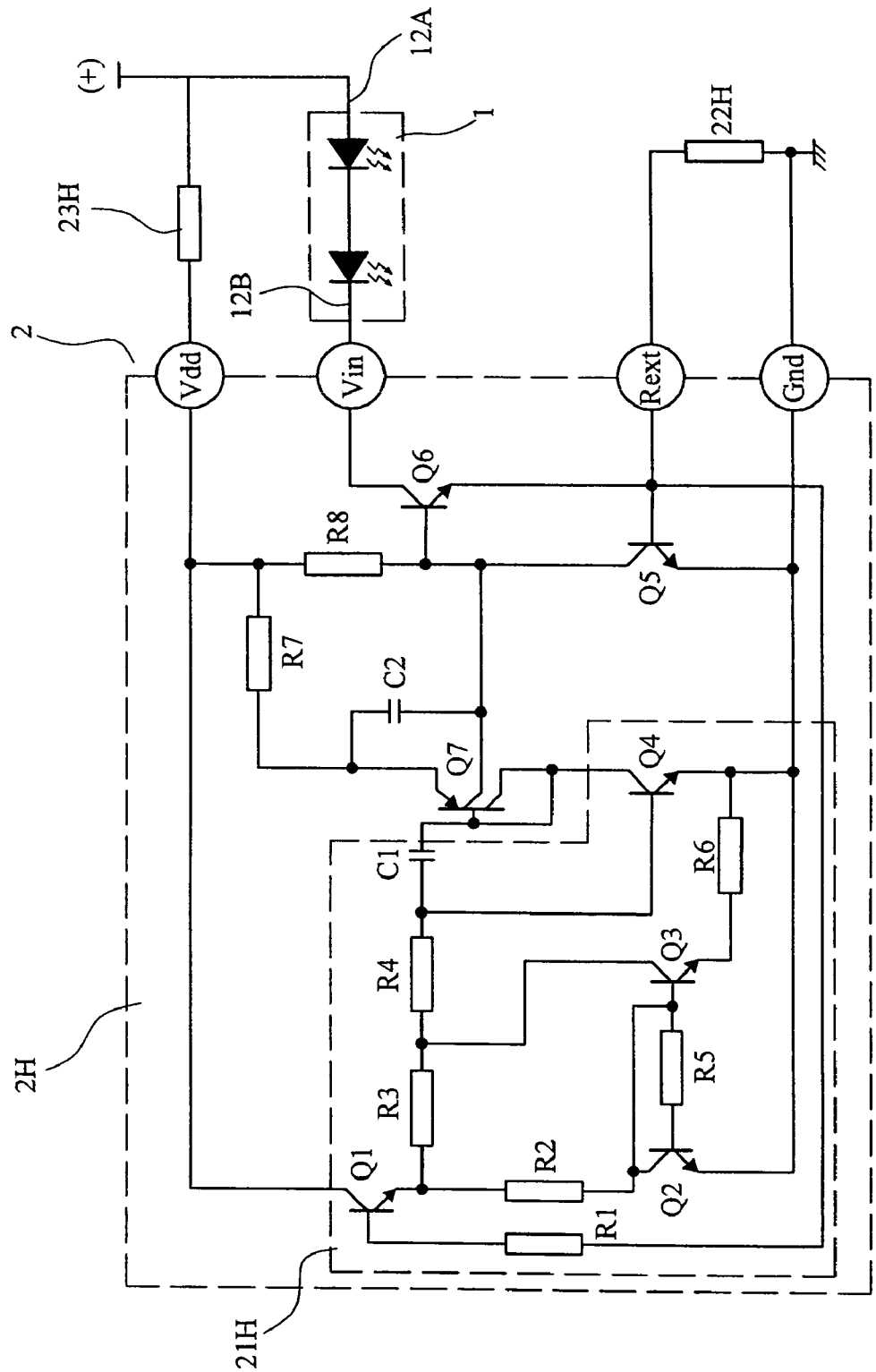
FIG. 4A is a detailed circuit diagram of constant current stabilization unit and other associated components shown in FIG. 4.
Figure 5:
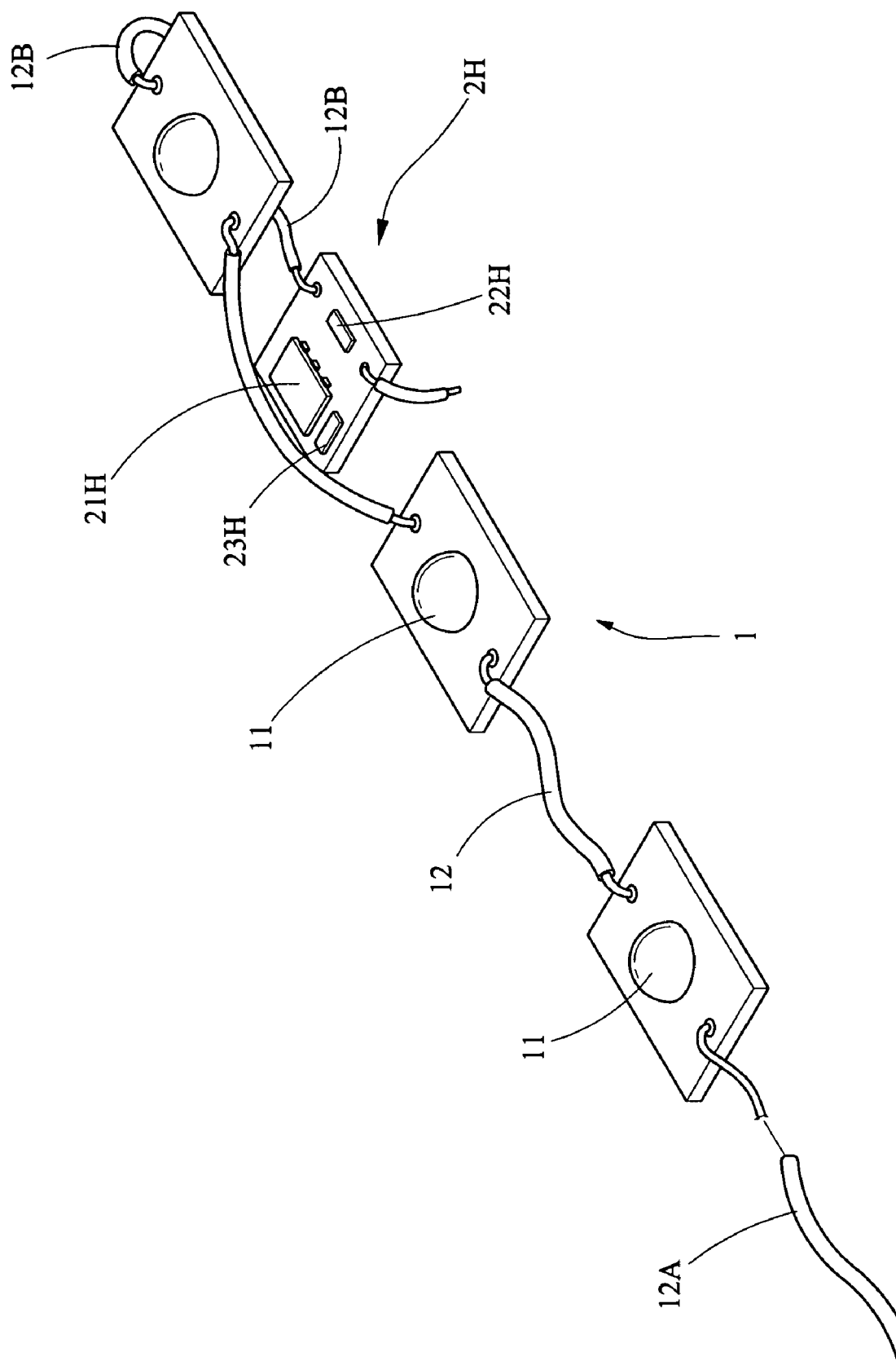
FIG. 5 is a perspective view of the strip light shown in FIG. 4.

FIGS. 4–4A and 5, there is shown a tenth preferred embodiment of strip light according to the invention. The tenth preferred embodiment is characterized in a constant current stabilization unit 2H as detailed below. In this embodiment, the power source may be adapted to supply a voltage in a range of 3 V to 260 V. The constant current stabilization unit 2H comprises a voltage stabilizer 21H, a first current regulator 22H interconnected a current regulation terminal (Rext) of the constant current stabilization unit 2H and ground in which the first current regulator 22H is also coupled to a ground (Gnd) terminal of the constant current stabilization unit 2H, and a second current regulator 23H interconnected the wire 12A of the illuminating unit 1 and a voltage terminal (VDD) of the constant current stabilization unit 2H, the wire 12A further electrically connected to a positive terminal (+) of power source, in which the wire 12B of the illuminating unit 1 is coupled to an input terminal (Vin) of the constant current stabilization unit 2H. The first current regulator 22H is adapted to regulate current fed from the illuminating unit 1. According to this specific embodiment of the invention, the voltage stabilizer 21H is implemented as a DD231 IC based voltage stabilizer 21H. Hence, the second current regulator 23H is adapted to supply a predetermined current to VDD. The predetermined current is further stabilized by the DD231 IC based voltage stabilizer 21H to supply a constant current. In a case of resistance variation of the LED 11 or the brightness of the LED 11 being insufficient, the first current regulator 22H is adapted to regulate current to cause the constant current stabilization unit 2H to generate a constant current. In other words, a constant current is always supplied to each LED 11.

Referring to FIG. 4A specifically, the circuitry comprises a constant current stabilization unit 2H and a first current regulator 22H together forming an illuminating unit 1 having a temperature compensating capability. Further, constant current control can be effected through PWM (pulse width modulation). The constant current stabilization unit 2H comprises four nodes VDD, VIN, Rext, and Gnd. Nodes VIN and VDD are electrically connected to the wire 12B of the illuminating unit 1 and one end of the second current regulator 23H respectively. The wire 12A of the illuminating unit 1 and the other end of the second current regulator 23H are electrically connected to a positive terminal (+) of power source. Also, node Rext is electrically connected to a current regulator 22H which is in turn connected to ground and node Gnd is connected to ground. Preferably, the current regulator 22H is a resistor.

The constant current stabilization unit 2H further comprises a voltage stabilizer 21H, a transistor Q6 as a switch, a transistor Q5 as a controller, a transistor Q7 for compensating temperature and preferably being a bipolar junction transistor (BJT), a plurality of resistors R1 to R8, and a plurality of capacitors C1 and C2 together forming a constant current circuit. Input voltage from the second current regulator 23H is applied to the parallel resistors R7 and R8 for turning on the transistor Q6 and thus activating the illuminating unit 1 (i.e., LED). Also, the transistor Q5 is adapted to control the turning on of the transistor Q6 based on current fed from the current regulator 22H for maintaining a constant current. The capacitor C2 is charged by the resistor R7. The voltage stabilizer 21H is comprised of a first transistor Q1, a second transistor Q2, a third transistor Q3, a fourth transistor Q4, and a plurality of resistors R1 to R6. A turning on or not of the transistor Q6 is responsible for comparing input voltage with a predetermined voltage and amplifying output voltage. The capacitor C1 is charged by the resistor R4. The capacitor C1 is discharged for turning on the transistor Q7 in response to rising temperature. Also, the capacitor C2 is discharged to decrease current flowing through the illuminating unit 1 to prevent the illuminating unit 1 from being damaged.

For further understanding the circuit of the present invention, please refer to FIG. 4A. A strip light device comprises a constant current stabilization unit 2H having a first, a second, a third and a ground terminals; a first current regulator 22H as an output being electrically connected to the third terminal and the ground terminal of the constant current stabilization unit 2H; a second current regulator 23H being electrically connected to the first terminal of the constant current stabilization unit and a positive terminal of a power source; and an illuminating unit 1 including a plurality of illuminators 11 directly and electrically coupled in series which is electrically connected to the second terminal of the constant current stabilization unit 2H and the positive terminal of the power source; the constant current stabilization unit 2H further comprising: a first transistor Q6 as a switch means and having a first resistor R8 electrically coupled in parallel to the second current regulator 23H and the illuminating unit 1 and being turned on in response to current feeding from the first resistor R8; a second transistor Q5 as a controller electrically coupled in parallel to the first transistor Q6 and the first current regulator 22H, the second transistor Q5 being adapted to control a turning on of the first transistor Q6 in response to feeding current from the first current regulator 22H for maintaining a constant current; a third transistor Q7 for compensating temperature and including a second resistor R7 and a first capacitor C2 and being electrically coupled in parallel to the first transistor Q6; and a voltage stabilizer 21H including a fourth transistor, a fifth transistor, a sixth transistor, a seventh transistor Q1–Q4, a plurality of third resistors R1–R6, and a second capacitor C1 wherein a turning on or not of the first transistor Q6 is responsible for comparing an input voltage with a predetermined voltage and amplifying an output voltage, and the second capacitor C1 is charged by one of the third resistors; wherein the constant current stabilization unit 2H is operative to supply a constant current to each of the illuminators 11, the second capacitor C1 is discharged for turning on the third transistor Q7 in response to rising temperature, and the first capacitor C2 is discharged to decrease current flowing through the illuminating unit 1.

Figure 6:
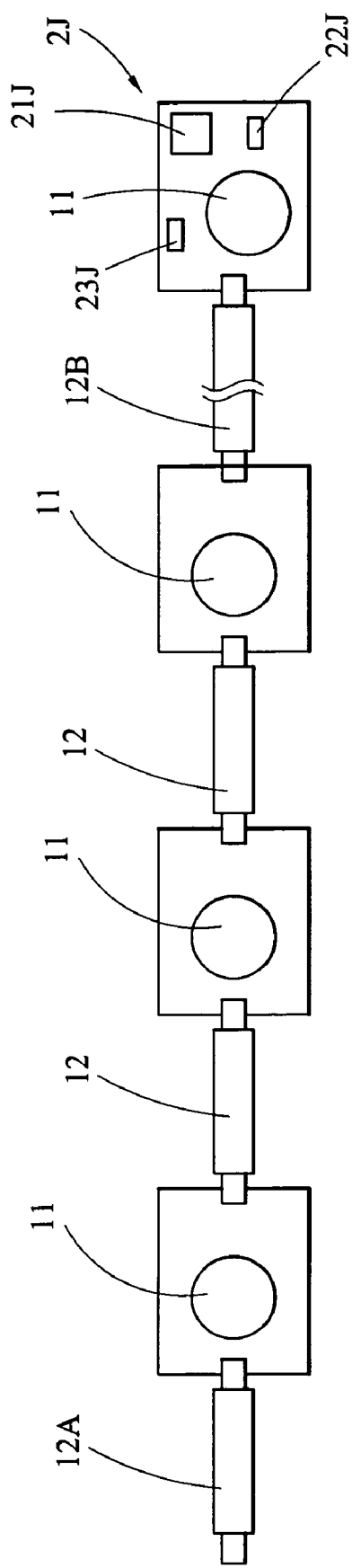
FIG. 6 schematically depicts the electrical connection of an eleventh preferred embodiment of strip light according to the invention.

FIG. 6 schematically depicts the electrical connection of an eleventh preferred embodiment of strip light according to the invention. One of the illuminators 11 (e.g., the right one as shown) is implemented as a COB type LED mounted on a constant current stabilization unit 2J. The constant current stabilization unit is implemented as a COB type constant current stabilization unit 2J. Also, the voltage stabilizer is implemented as a COB type voltage stabilizer 21J and the current regulator is implemented as a COB type current regulator including a COB type first current regulator 22J and a COB type second current regulator 23J. The COB type LED 11 is electrically coupled to the COB type voltage stabilizer 21J and the COB type first and second current regulators 22J and 23J in series. The wires of flat metal foil type 12, 12A, and 12B having a relatively larger flat cross-sectional area, coupled to the LEDs 11, are capable of permitting a relatively large current to pass therethrough. The wire 12B is coupled between the COB type LED 11 and the adjacent LED 11.

In addition to the supplying of constant current to each LED 11, other benefits of the invention include energy saving, even brightness of the LEDs 11, less heat generation, and durability.

Figure 7:
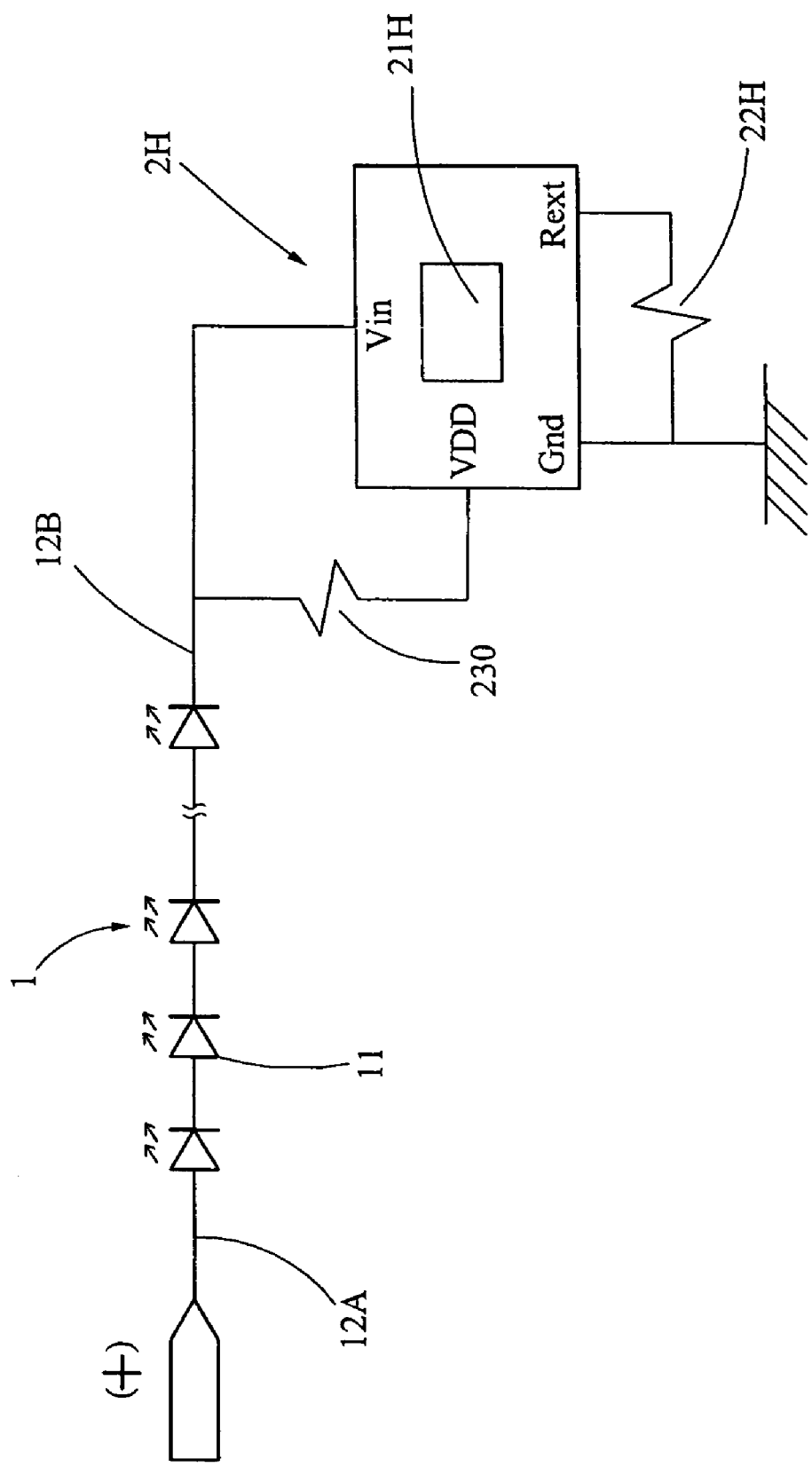
FIG. 7 schematically depicts the electrical connection of a twelfth preferred embodiment of strip light according to the invention.
Figure 7A:
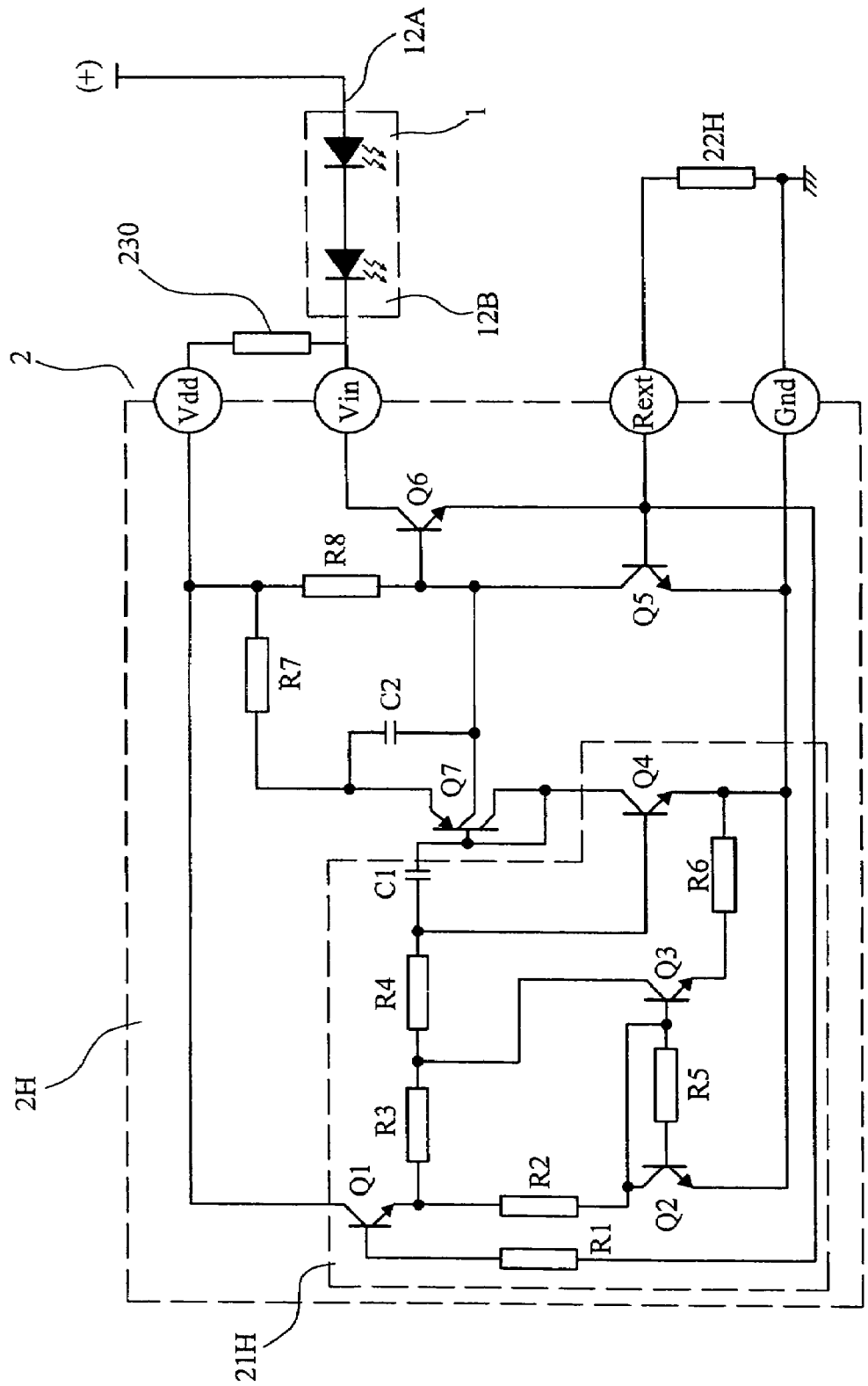
FIG. 7A is a detailed circuit diagram of constant current stabilization unit and other associated components shown in FIG. 7.

Referring to FIGS. 7 and 7A, a twelfth preferred embodiment of strip light according to the invention is shown. The twelfth preferred embodiment substantially has same structure as the tenth preferred embodiment. The characteristics of the twelfth preferred embodiment are detailed below. The circuitry comprises a constant current stabilization unit 2H and a first current regulator 22H together forming an illuminating unit 1 having a temperature compensating capability. Further, constant current control can be effected through PWM. Node VIN is electrically connected to the wire 12B of the illuminating unit 1. Node VDD is electrically connected to a third current regulator 230 which is in turn electrically connected to the wire 12B of the illuminating unit 1. The wire 12A of the illuminating unit 1 is electrically connected to a positive terminal (+) of power source. Also, node Rext is electrically connected to a current regulator 22H which is in turn connected to ground and node Gnd is connected to ground. Preferably, the current regulator 22H is a resistor. Input voltage from the third current regulator 230 is applied to the parallel resistors R7 and R8 for turning on the transistor Q6 and thus activating the illuminating unit 1 (i.e., LED). Also, the transistor Q5 is adapted to control the turning on of the transistor Q6 based on current fed from the current regulator 22H for maintaining a constant current.

While the invention herein disclosed has been described by means of specific embodiments, numerous modifications and variations could be made thereto by those skilled in the art without departing from the scope and spirit of the invention set forth in the claims.

What is claimed is:

1. A strip light device, comprising:
a constant current stabilization unit (2H) having a first, a second, a third and a ground terminals;
a first current regulator (22H) as an output being electrically connected to the third terminal and the ground terminal of the constant current stabilization unit (2H);
a second current regulator (23H) being electrically connected to both the first terminal of the constant current stabilization unit (2H) and a positive terminal of a power source; and
an illuminating unit (1) including a plurality of illuminators (11) directly and electrically coupled in series which is electrically connected to the second terminal of the constant current stabilization unit (2H) and the positive terminal of the power source;
the constant current stabilization unit (2H) further comprising:
a first transistor (Q6) as a switch means and having a first resistor (R8) electrically coupled in parallel to the second current regulator (23H) and the illuminating unit and being turned on in response to current feeding from the first resistor;
a second transistor (Q5) as a controller electrically coupled in parallel to the first transistor (Q6) and the first current regulator (22H), the second transistor (Q5) being adapted to control a turning on of the first transistor (Q6) in response to feeding current from the first current regulator (22H) for maintaining a constant current;
a third transistor (Q7) for compensating temperature and including a second resistor (R7) and a first capacitor (C2) and being electrically coupled in parallel to the first transistor (Q6); and
a voltage stabilizer (21H) including a fourth transistor (Q1), a fifth transistor (Q2), a sixth transistor (Q3), a seventh transistor (Q4), a plurality of third resistors (R1–R6), and a second capacitor (C1) wherein a turning on or not of the first transistor (Q6) is responsible for comparing an input voltage with a predetermined voltage and amplifying an output voltage, and the second capacitor (C1) is charged by one of the third resistors;
wherein the constant current stabilization unit (2H) is operative to supply a constant current to each of the illuminators (11), the second capacitor (C1) is discharged for turning on the third transistor (Q7) in response to rising temperature, and the first capacitor (C2) is discharged to decrease current flowing through the illuminating unit (1).

2. The strip light device of claim 1, wherein the constant current stabilization unit (2H) is a voltage stabilizer.

3. The strip light device of claim 1, wherein the constant current stabilization unit (2H) is a current stabilizer.

4. The strip light device of claim 1, wherein the constant current stabilization unit (2H) is a COB type voltage stabilizer and the first and second current regulators (22H, 23H) are a resistor means of a COB type.

5. The strip light device of claim 1, wherein the constant current stabilization unit (2H) is a SMD type voltage stabilizer and the first and second current regulators (22H, 23H) are a resistor means of a SMD type.

6. The strip light device of claim 1, wherein the constant current stabilization unit (2H) is a bare dice encapsulation type voltage stabilizer and the first and second current regulators (22H, 23H) are a resistor means of a SMD type.

7. The strip light device of claim 1, wherein the constant current stabilization unit (2H) is a SMD type voltage stabilizer and the first and second current regulators (22H, 23H) are a printed carbon film type.

8. The strip light device of claim 1, wherein the constant current stabilization unit is a bare dice encapsulation type voltage stabilizer and the first and second current regulators (22H, 23H) are a printed carbon film type.

9. The strip light device of claim 1, wherein the constant current stabilization unit (2H) is a COB type constant current stabilization unit mounted on a circuit board.

10. The strip light device of claim 1, wherein the constant current stabilization unit (2H) is a COB type constant current stabilization unit mounted on a circuit board, and the illuminating unit (1) is a COB type LED mounted on the circuit board.

11. The strip light device of claim 1, wherein the third transistor (Q7) is a bipolar junction transistor (BJT).

12. A strip light device, comprising:
a constant current stabilization unit (2H) having a first, a second, a third and a ground terminals;
a first current regulator (22H) as an output being electrically connected to the third terminal and the ground terminal of the constant current stabilization unit (2H);
a second current regulator (230) being electrically connected to the first terminal and a second terminal of the constant current stabilization unit (2H); and an illuminating unit (1) including a plurality of illuminators (11) directly and electrically coupled in series which is electrically connected to the second terminal of the constant current stabilization unit and the positive terminal of a power source;

the constant current stabilization unit (2H) further comprising:

a first transistor (Q6) as a switch means and having a first resistor (R8) electrically coupled in parallel to the second current regulator and the illuminating unit (1) and being turned on in response to current feeding from the first resistor (R8);

a second transistor (Q5) as a controller electrically coupled in parallel to the first transistor (Q6) and the first current regulator (22H), the second transistor (Q5) being adapted to control a turning on of the first transistor (Q6) in response to feeding current from the first current regulator (22H) for maintaining a constant current;

a third transistor (Q7) for compensating temperature and including a second resistor (R7) and a first capacitor (C2) and being electrically coupled in parallel to the first transistor (Q6); and a voltage stabilizer (21H) including a fourth transistor (Q1), a fifth transistor (Q2), a sixth transistor (Q3), a seventh transistor (Q4), a plurality of third resistors (R1–R6), and a second capacitor (C1) wherein a turning on or not of the first transistor (Q6) is responsible for comparing an input voltage with a predetermined voltage and amplifying an output voltage, and the second capacitor (C1) is charged by one of the third resistors;

wherein the constant current stabilization unit (2H) is operative to supply a constant current to each of the illuminators (11), the second capacitor (C1) is discharged for turning on the third transistor (Q7) in response to rising temperature, and the first capacitor (C2) is discharged to decrease current flowing through the illuminating unit (1).

13. The strip light device of claim 12, wherein the constant current stabilization unit (2H) is a COB type voltage stabilizer and the first and second current regulators are a resistor means of a COB type.

14. The strip light device of claim 12, wherein the constant current stabilization unit (2H) is a SMD type voltage stabilizer and the first and second current regulators are a resistor means of a SMD type.

15. The strip light device of claim 12, wherein the constant current stabilization unit (2H) is a bare dice encapsulation type voltage stabilizer and the first and second current regulators are a resistor means of a SMD type.

16. The strip light device of claim 12, wherein the constant current stabilization unit (2H) is a SMD type voltage stabilizer and the first and second current regulators are a printed carbon film type.

17. The strip light device of claim 12, wherein the constant current stabilization unit (2H) is a bare dice encapsulation type voltage stabilizer and the first and second are a printed carbon film type.

18. The strip light device of claim 12, wherein the constant current stabilization unit (2H) is a COB type constant current stabilization unit mounted on a circuit board.

19. The strip light device of claim 12, wherein the constant current stabilization unit (2H) is a COB type constant current stabilization unit mounted on a circuit board, and the illuminating unit is a COB type LED mounted on the circuit board.

20. The strip light device of claim 12, wherein the third transistor (Q7) is a bipolar junction transistor (BJT).

* * * * *